Nov. 22, 1938.   W. A. BARR   2,137,222
AUTOMATIC CONTROL APPARATUS
Filed Oct. 13, 1936   5 Sheets-Sheet 1

INVENTOR.
WALTER A. BARR
BY Henry Love Clarke
his ATTORNEY

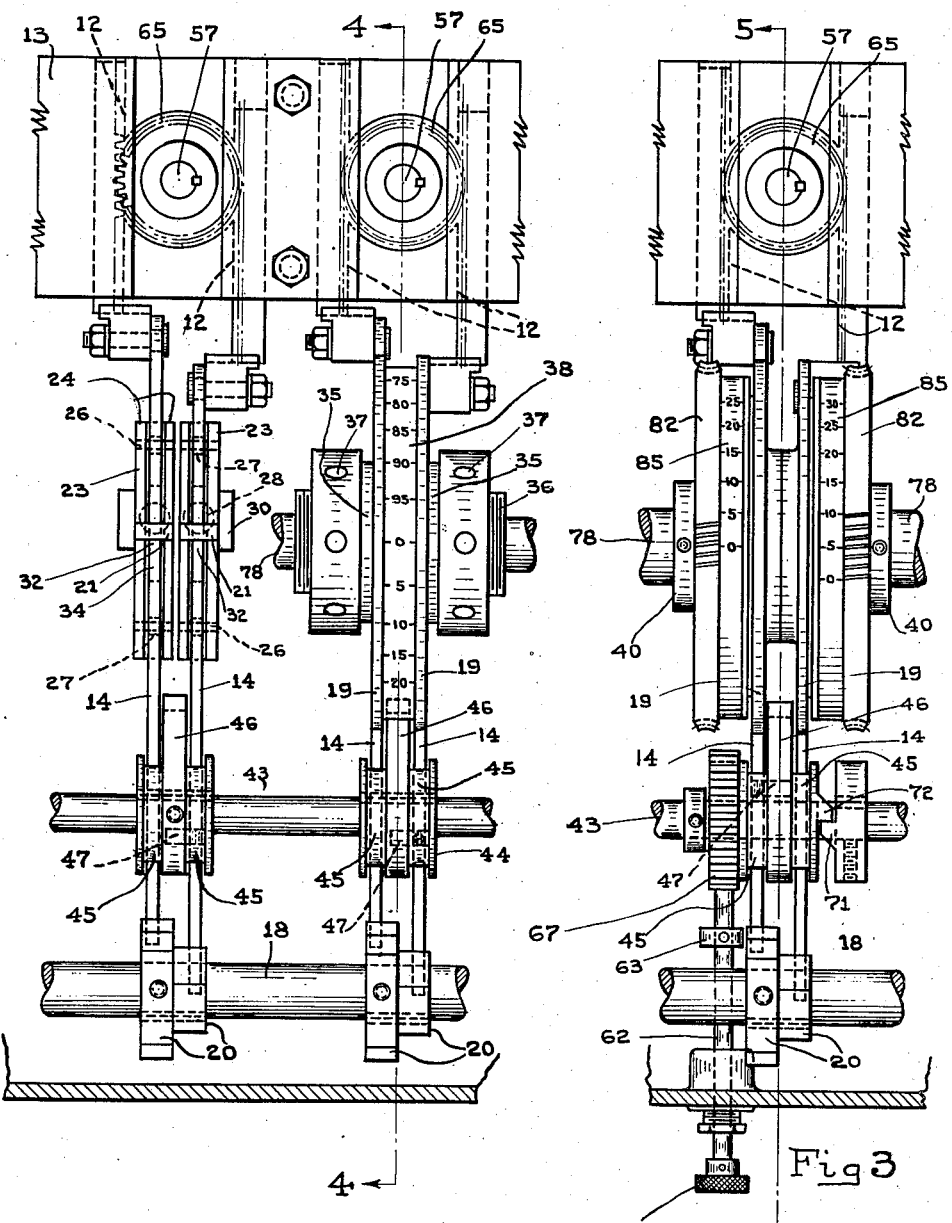

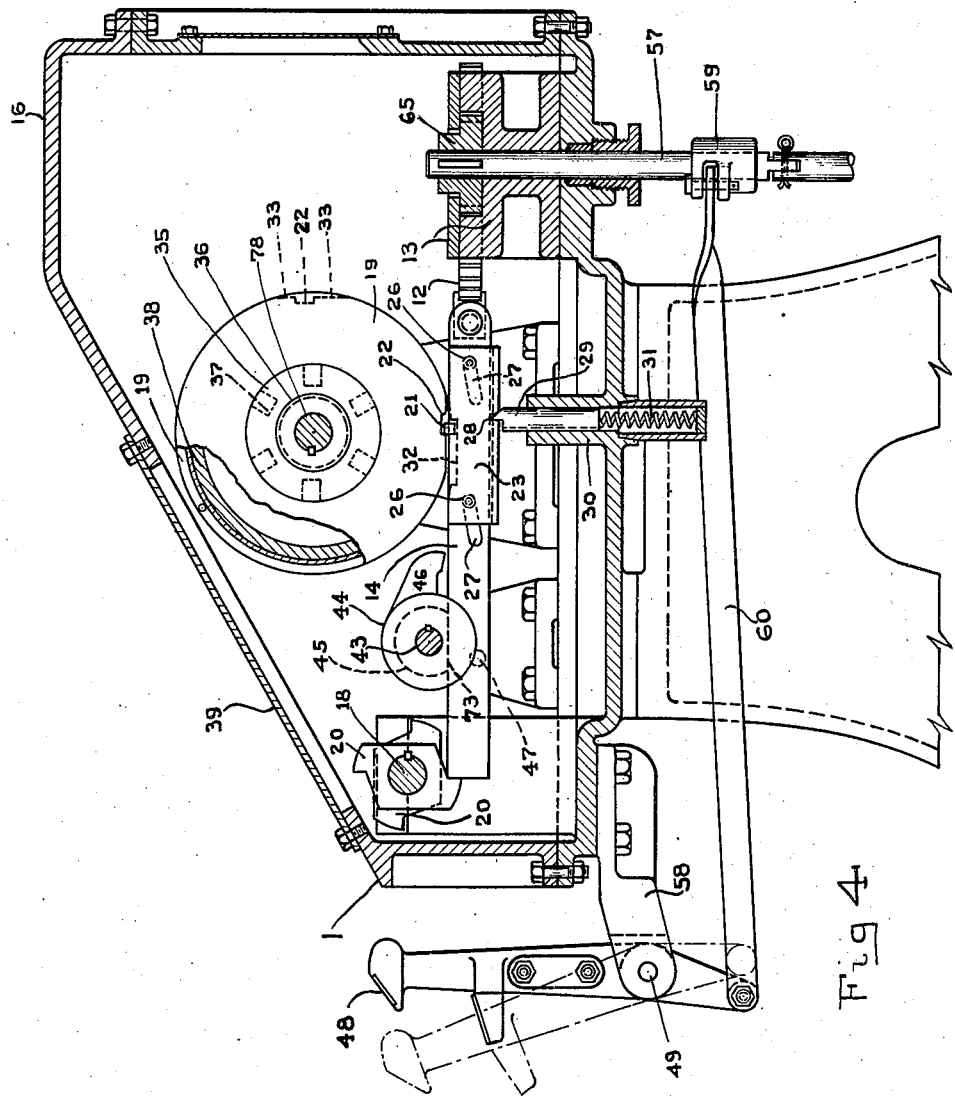

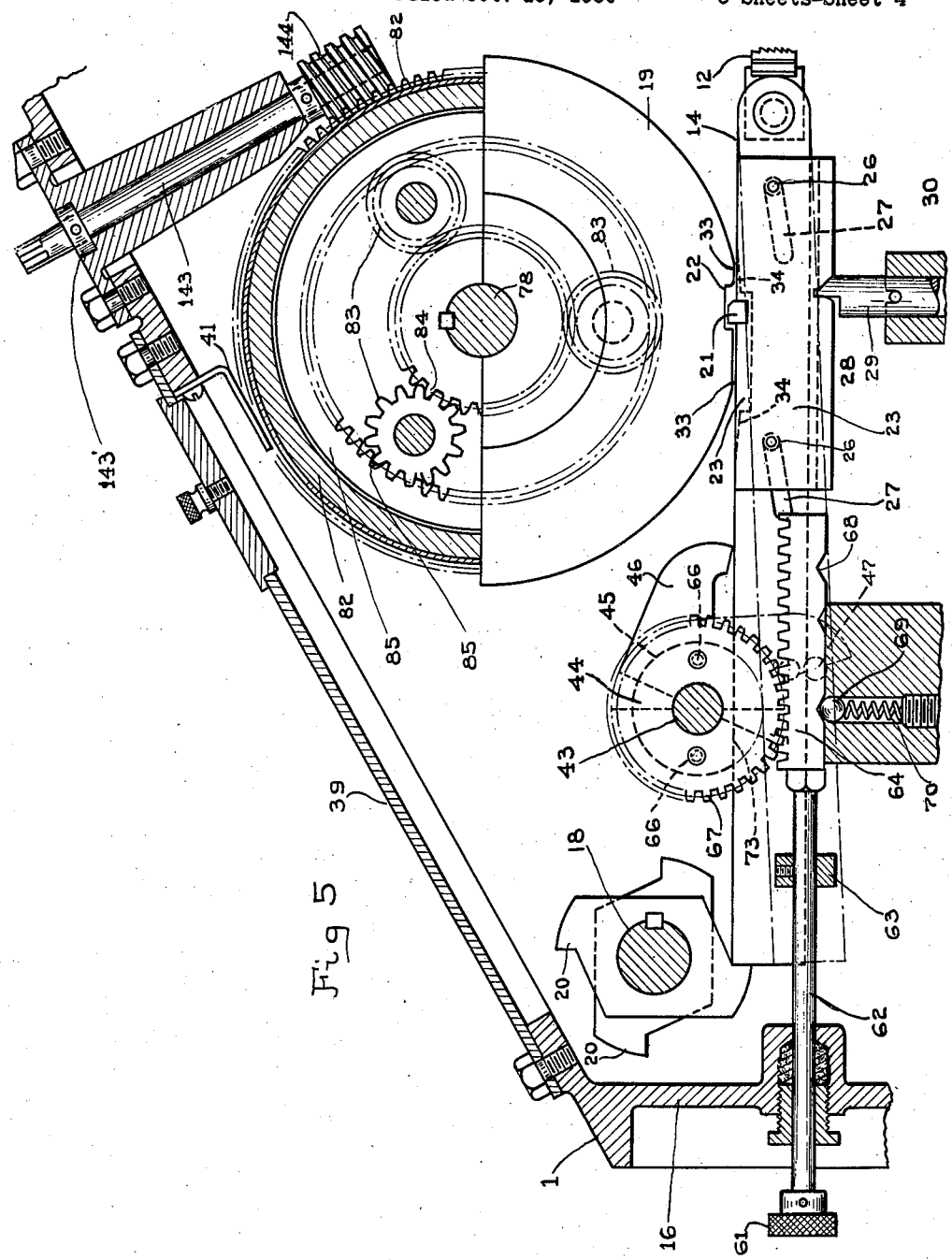

Nov. 22, 1938.　　　W. A. BARR　　　2,137,222
AUTOMATIC CONTROL APPARATUS
Filed Oct. 13, 1936　　　5 Sheets-Sheet 5

INVENTOR.
WALTER A. BARR
BY Henry Love Clarke
his ATTORNEY.

Patented Nov. 22, 1938

2,137,222

UNITED STATES PATENT OFFICE 2,137,222

AUTOMATIC CONTROL APPARATUS

Walter A. Barr, Fort Wayne, Ind., assignor to Koppers Company, a corporation of Delaware Application October 13, 1936, Serial No. 105,415

18 Claims. (Cl. 74—1)

This invention relates in general to improvements in automatic controls for automatically controlling the actuation of a mechanism or series of mechanisms, such as the operating mechanisms for the valves of water-gas sets, filter plants for water, incinerators, and the like, which series of mechanisms must be operated in proper sequence and periodically in order to control the operating mechanisms to form the necessary cycle of operations.

In apparatus of the type alluded to it is important that the operating mechanisms, such as the valves, be manipulated sequentially at exactly the right moments for reliable and efficient operation notwithstanding some of the valves, or mechanisms, are responsive to small movements and others to large movements, some to quick or rapid movements and others to slow or progressive movements.

Objects of the present invention are the provision of a simplified form of automatic control mechanism which is capable of being manufactured by relatively simple manufacturing operations, involves a simplified mode of operation in use, and is adapted for comparative ease in repair and replacements; the provision of a mechanism affording a low cost precision automatic control especially designed for the requirements of small and standby plants, and of such low cost construction that it may be economically operated with precision in instances even where there is need for only one set operating a few hours a day; and the invention has for further objects such other improvements and advantages in construction or operation as may be found to obtain in the structure and devices hereinafter described or claimed.

In its presently described embodiment, the invention is incorporated in apparatus primarily designed and particularly adapted for automatically sequentially controlling in timed relationship the periodically operable operating mechanisms for the apparatus valves of a carburetted water-gas set. For convenience, the present description will be confined principally to this use of the invention; features of the invention are, however, capable of other valuable application, for example, water-works, filter plants, incinerator plant control, and for any sequential cyclic operation in the process industries, such as chemical plants; consequently the scope of the invention is not confined in all of its aspects to the specific use and specific embodiment herein described as an illustrative example.

In the accompanying drawings, forming a part of this specification, and showing, for purposes of exemplification, a preferred form and manner in which the invention may be embodied and practiced, but without limiting the claimed invention to such illustrative instance or instances:

Fig. 2 is a top plan view of a portion of the actuating mechanism for controlling the direction of movement of the operating mechanism for the sequentially controlled valves, and of a portion of the timing mechanism therefor;

Fig. 3 is a top plan view similar to the right half portion of Fig. 2 but illustrating a different form of timing mechanism, and also means to disengage any actuating mechanism for any valve from automatic operation by the apparatus;

Fig. 4 is a side elevational view, partly in cross-section, taken on the line 4—4 of Fig. 2;

Fig. 5 is a side elevational view, partly in cross-section, taken on the line 5—5 of Fig. 3;

Figure 1:
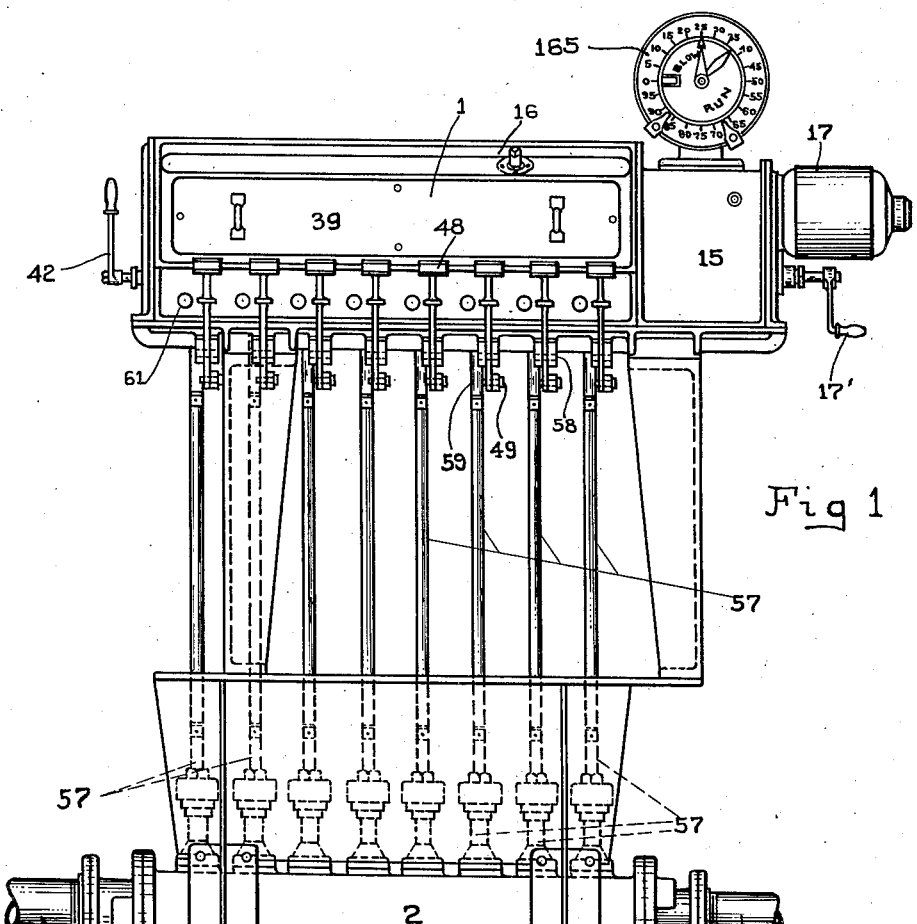
Figure 1 is a front elevational view of an automatic control apparatus embodying the present invention.
Figure 9:
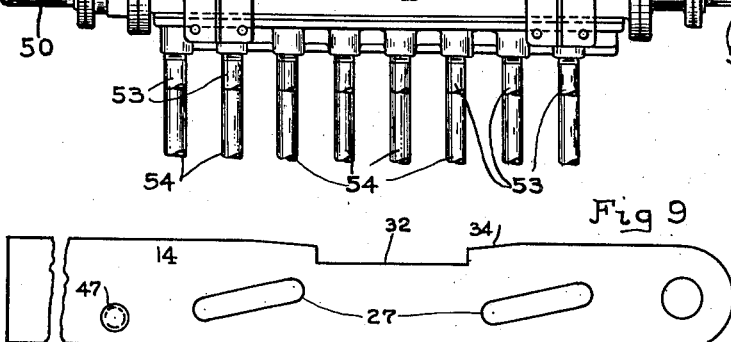
Fig. 9 is a side elevational view of one of the kicker-bars.
Figure 10:
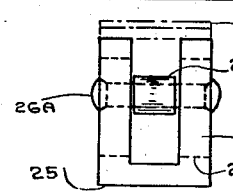
Fig. 10 is a vertical cross-sectional view of one of the kicker-bar slides.

The apparatus of the present invention comprises a controlling and timing mechanism 1 adapted to operate a group 2 of four-way reversing valves, the valves of the group 2 being respectively inserted in hydraulic lines leading to the various apparatus valves of a water-gas set, as shown in United States Patent No. 1,955,033 to Thomas W. Stone.

The group of four-way valves has a single inlet port 50 and a single exhaust port 51, the group being made up of a plurality of individual valves. Each individual valve of the group 2 is provided with a pipe 53 for supplying fluid to one end of one of the hydraulic cylinders that operates a valve in a water-gas set. Each individual valve of the group 2 is also provided with a pipe 54 that is connected to the opposite end of the corresponding cylinder just mentioned. Each of the individual valves of the group 2 is provided with a rotatable valve stem 57 for reciprocating a piston valve in a cylinder to communicate the respective pipes 53 and 54, in alternation with each other, one with the high pressure line 50 and the other with the exhaust port 51, all as more clearly appears from the foregoing Stone Patent 1,955,033. As the further details of construction and operation of the structure just described may be readily ascertained from said patent, the foregoing condensed description of said parts suffices for an understanding of the present invention.

Each valve stem 57 through the valve that it operates controls the direction of fluid movement through the lines 53, 54, for controlling the direction of movement of the main apparatus operating mechanism, and each valve stem 57 is turned by corresponding portions of the mechanism 1. The mechanism 1 not only turns each stem 57 but correctly times such turning to keep the various operations of the gas-making or other set or plant in proper sequence for carrying out a predetermined cycle.

Attached to the upper part of each of the valve stems 57 is a gear 65 and meshed on opposite sides of each of the gears 65 are actuating mechanism therefor comprising a pair of oppositely acting racks 12 retained in keepers 13. To each rack of a pair a push rod or kicker-bar 14 is pivotally attached.

A main timing shaft 78 is motor driven at the required cyclic time by means of proper reduction gears and a set of quick change gears, within the rear portion of the region 15 of the casing 16, which gears connect a main driving gear on the timing shaft 78 with a primary source of power, such as the motor 17. A driving power shaft 18, hereinafter also termed the kicker-cam shaft, is also driven at a constant speed of about thirty revolutions per minute by means of the motor 17 and reduction gearing within the front portion of the region 15 of the casing 16. The motor gearing connects both trains of gearing with each other so as to be rotated by the motor 17 and its connection with the main timing shaft comprises an over running clutch inserted in the driving gear on the timing shaft. For manual operation a hand crank 17' is connected by gearing with the main driving gear on the timing shaft so that the hand crank can advance the timing cams whether the motor is running or not and the advancement of the timing cams does not advance or rotate the gearing which connects to the timing gears or kicker shaft gears.

The gears within the rear portion of the region 15 are preferably such that the speed of rotation of the timing-shaft 78 can be varied, say from four minutes to five or six minutes per revolution when the driving-power or kicker-cam shaft 18 rotates at a constant speed of about thirty revolutions per minute.

A pair of timing cams 19 are provided on the timing-shaft 78 for each of the pairs of racks 12 for each gear 65 and valve stem 57; and two sets of kicker-cams 20 are likewise provided on the driving-power or kicker-cam shaft 18 for each pair of racks 12. A hardened steel block, key or pawl, 21, is provided for each kicker-bar or push rod 14. Each of the pawls or keys 21 rests firmly against its respective cam 19 and thereby holds its respective kicker-bar or push rod 14 out of contact with its respective continuously rotating kicker-bar cam 20.

On each timing-cam 19, means are provided such as a recessed portion or notch 22, for reception of the pawl or key 21 of its individual push rod or kicker-bar 14. When the respective timing-cams 19 rotate to the position at which their respective pawls 21 may enter their respective recesses 22, the entry of the pawl 21 into the recess 22 allows the kicker-bar 14 to rise and come in contact with the kicker-cam 20.

As the kicker-cam 20 revolves in a counter-clockwise direction, the kicker-bar or push rod 14 is pushed forward, which pushes its rack 12 forward so that the rack rotates the gear 65 and valve stem 57.

The timing-cams 19 of each pair are so positioned on the timing shaft 78 as to cause the pair of racks 12 to act oppositely to each other, that is, when one rack 12 of a pair moves forwardly, it not only turns the gear 65 and valve stem 57 but also returns the other rack 12 of the same pair, so that when one rack 12 is moved forwardly the valve attached to stem 57 moves in one direction, and when the other rack 12 of the same pair is moved forwardly the valve attached to the same stem 57 is returned in the opposite direction.

For moving the kicker-bars or push rods 14 into the path of the kicker-cams 20 and for supporting the former during the back and forth movements of the kicker-bars 14, each kicker-bar 14 is provided with a kicker-bar slide 23 comprising sides 24 and a bottom connecting web 25 within which the kicker-bar 14 is reciprocally retained. In the kicker-bar slide 23 two steel rollers 26 and carried on pin 26A are provided, in the present instance spaced exactly 4¼" apart. The two rollers 26 extend through two spaced upwardly inclined slots 27, likewise spaced 4¼" apart, in the kicker-bar 14 for relative movement of the latter with respect to the kicker-bar slide 23.

Figure 6:
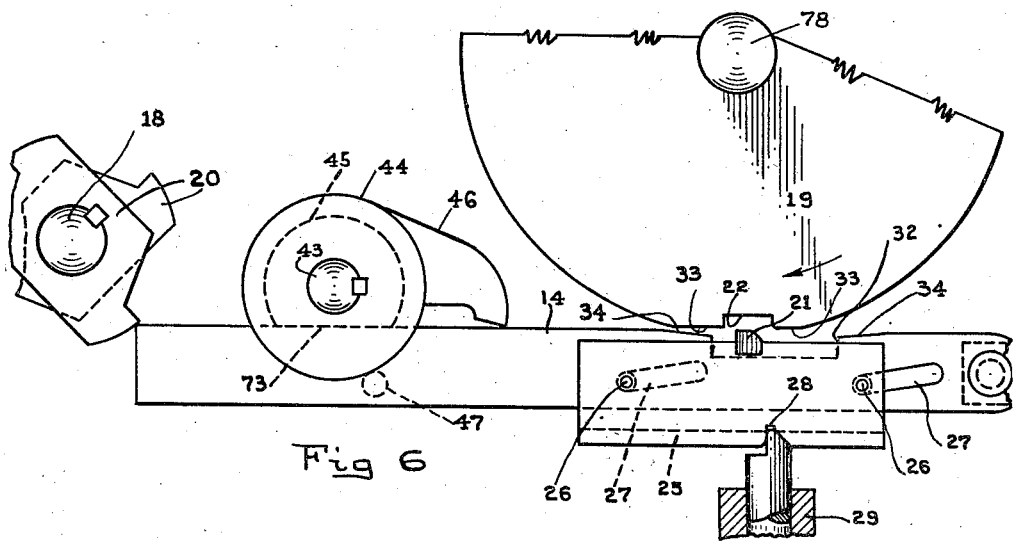
Figs. 6, 7 and 8 are side elevational views illustrating three positions in the cycle of operation of the actuating mechanism.
Figure 7:
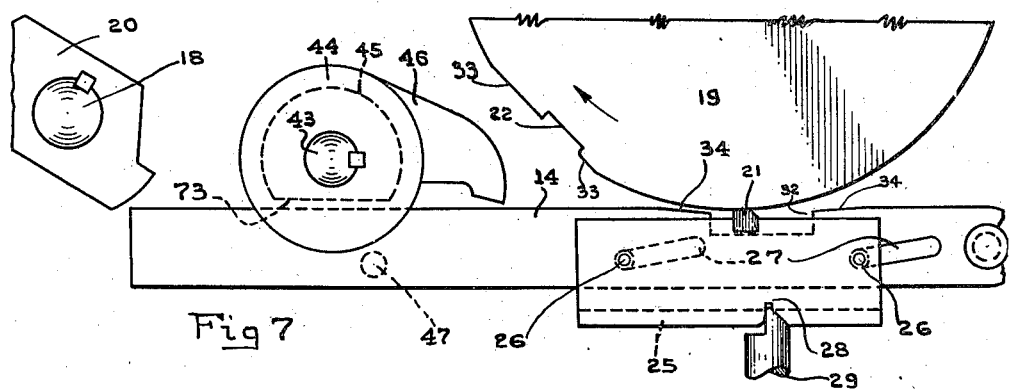
Figure 8:
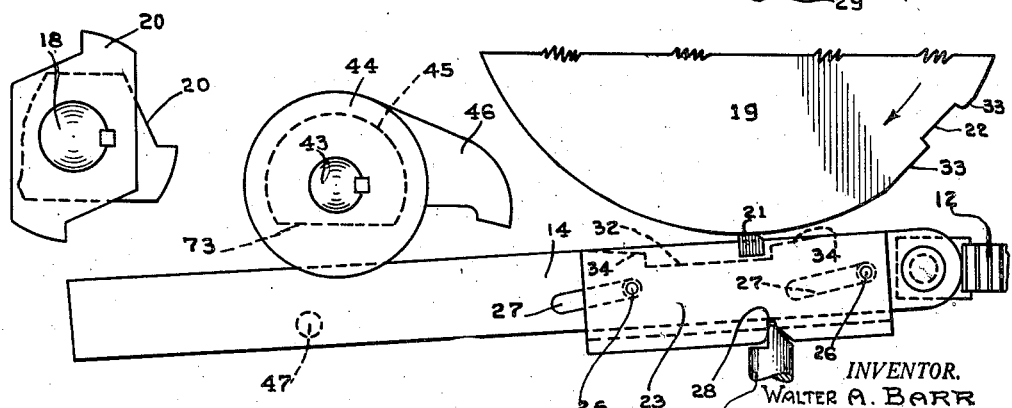

The steel block or pawls 21, which engage the timing-cams 19, are fastened in grooves in the tops of the sides 24 of the kicker-bar slide 23. The bottom 25 of the kicker-bar 23 is provided with a V-shaped notch 28 slightly to the rear of the plane of the pawl 21. A plunger 29, vertically reciprocal within a casing 30, is pressed by means of a spring 31 into the V-shaped notch 28, thus urging the kicker-bar 14 in a direction into the path of the kicker-cam 20 and the pawl 21 into contact with its timing-cam 19. The kicker-bar 14 is recessed at 32 to permit the kicker-bar 14 to slide relative to the pawl 21 when the kicker-bar 14 is pushed forward by the kicker-cam 20 or pushed backward by the reverse rotation of the gear 57 by the companion kicker-bar 14 of the same pair. As will be seen from Figs. 4, 6, 7 and 8, when each kicker-bar 14 is pushed back toward its kicker-bar cam 20 the pawl 21 and slide 23 are held against longitudinal movement by the spring pressed plunger 29 but the kicker-bar 14 moves to the left, as shown in Fig. 8, and in so doing the rollers 26 ride up the inclined slots 27 permitting the slide 23 and pawl 21 to rise relative to the kicker-bar 14 until the pawl engages its timing-cam 19. The pawl 21 then rides on the face of the timing-cam 19, and the adjustments are such that the left-hand end of the kicker-bar 14 is held depressed so that it does not engage the kicker-bar cam 20. However, as soon as the notch 22 in the timing-cam 19 lines up with the kicker-bar slide pawl (or key) 21, the whole assembly of kicker-bar slide 23, pawl 21 and kicker-bar 14 is raised by the action of the spring pressed plunger 29. As soon as the kicker-bar 14 thus rises, it is engaged by the kicker-bar cam 20, as shown in Fig. 4, and the kicker-bar 14 pushed forward. When this happens the slide 23 does not move horizontally but the kicker-bar 14 slides forward over the rollers 26 in the slide 23, thus depressing the slide 23 and plunger 29 against the spring 31, and the slide 23 consequently carries the pawl 21 downwardly with it to below the top edge of the kicker-bar 14 and thereby withdraws the pawl 21 from the notch 22 in the timing-cam 19, as shown in Fig. 6.

The main timing-cams 19 each have a slight flat spot 33 both before and behind their respective notches 22 and the kicker-bar 14 is inclined at 34 toward its recess 32 both before and behind the same. As these flat spots 33 pass the kicker-bar 14 they slightly depress the kicker-bar and hence the kicker-bar does not engage the end of the kicker-bar cam 20 as it revolves, and thereby avoids a nibbling action on the kicker-bar 14 by the kicker-cam 20, until the pawl 21 can reengage the full face of the timing-cam 19, as shown in Fig. 7, at which position the kicker-bar 14 is held out of engagement with the kicker-cam 20 until the kicker-bar 14 is reversed to the position shown in Fig. 8 for subsequent reengagement as shown in Fig. 4.

The kicker-cam 20 revolves at a constant speed, preferably thirty times a minute. Hence there is an interval of one second for the kicker-bars 14 to wait to be pushed or advanced by the kicker-cams 20. As the main timing-cams 19 revolve continuously the notches or slots 22 in the timing-cams 19 are made of sufficient length that the notches or slots 22 will not foul the slide-pawls or keys 21 before the kicker-bars 14 have been pushed forward by the kicker-cams 20. For example, in a control operating on about a three minute cycle and having timing-cams 19 about 8" or 9" in diameter, a clearance of the order of ⅛ of an inch is provided, that is, if the kicker-bar slide-pawls or keys 21 are ⅜" wide, the notches or slots 22 in the timing-cams 19 are at least ½" or more in length.

As shown in Figs. 2 and 4, the companion timing-cams 19 of a pair are mounted on the timing shaft 78 so as to be adjustable relative to each other to vary the interval between the actuation of one kicker-bar 14 and the actuation of the other kicker-bar 14 of the same pair. To this end the timing-cams 19 are provided with collars 35 clamped to a cam-hub 36 by lock nuts 37. Each cam-hub 36 is keyed to the main timing shaft 78 and is provided with an integral disk 38, having degrees indicated on its circumference, against which the timing-cams 19 are adjustably secured by means of the removable lock nuts 37 and by turning the timing-cams 19 around the hub 36. A lock washer 35 is keyed to the hub 36 but so as to be movable parallel to the axis of the hub 36, which lock washer prevents the lock nut 37 from rotating cam 19 when the lock nut 37 is either loosened or tightened. The principal portion of the above-described mechanism is contained within the casing 16 which has its forward upper part inclined and provided with a removable glass or other transparent cover 39 for easy access to the mechanism inside the casing. By such structure the timing-cams 19 may be readily adjusted as above described for water-gas manufacture operation without dismantling the mechanism. Such mechanism is also peculiarly adapted for operation in plants such as water filter plants, or incinerators, in which selective variation of the positions of the companion cams 19 of a pair is not so essential.

The hereinbefore described mechanism also lends itself readily to the employment of a differential timing-cam mechanism. As shown in Figs. 3 and 5 a differential timing mechanism of the type exemplified in United States Patent No. 1,955,033, to Thomas W. Stone, is readily employed. As the details of such differential timing mechanism may be readily understood from said patent, the present description will be confined to only so much thereof as suffices for an understanding of its applicability to the structure of the present invention, and therefore reference is hereby made to said patent for a more complete understanding of the same. Each differential assembly comprises a pair of normally stationary worm wheels 82 each of which has a plurality of planetary gears 83 mounted for rotation on the wheels 82. A spur gear 84 is keyed on the timing shaft 78 opposite each set of three planetary gears 83 and meshes therewith. The motion of the spur gears 84 is transmitted through the set of three planetary gears 83 to annular ring gears 85 secured to the respective timing-cams 19. The annular ring gears 85 carry on their outer perimeters a scale indicating the relative positions of the notches of the timing-cams. Each gear 85 and its timing-cam 19 rotate in the opposite direction to, and at a slower rate than, the spur gear 84. Each gear 82 is freely rotatable on the cam-shaft hub 40 and is provided with a worm 144 for adjusting its timing-cam 19. The worms 144 are placed at a high elevation and have shafts 143 extending through apertures 143' in the casing for easy access in manipulating the worms 144. A pointer 41 is provided for fixing the position on the scale to be read for indicating the location of the cam notches 22. The apparatus also embodies the cycle indicator 165 and the attendant apparatus therefor as shown in said Stone Patent 1,955,033. As the details of such elements are readily ascertainable from said patent, such mechanism need not here be described in greater detail.

On the extreme left end of the casing 16 a universal shut-down lever 42 is provided for rotating a shut-down shaft 43 provided with shut-down cams 44. As shown in Figs. 2 and 4, the shut-down cams 44 comprise a pair of cam surfaces 45 for each pair of kicker-bars 14, one cam surface for each kicker-bar. The pair of cam surfaces 45 are united to each other by an intermediate shut-down ear 46. The shut-down lever 42, when set vertically, positions the shut-down cams 44 in normal position permitting automatic operation of the kicker-bars 14 by the kicker-cams 20. When the lever 42 is moved toward the rear of the machine by the operator, the machine is shut down from both hand and automatic operation. The cam surfaces 45 engage the kicker-bars 14 and hold them down out of engagement by the kicker-cams 20 and hold the kicker-bar slide pawls 21 out of contact with the timing-cams 19. When this is done the shut-down ear 46 engages a pin 47, provided on only one of the kicker-bars of the respective pairs, to rotate the valve stem 57 to correct position for shut-down. When the shut-down lever 42 is moved toward the front of the machine, the machine is shut down from automatic but not hand operation. In this event the shut-down shaft is rotated counter-clockwise (Fig. 4) lifting the shut-down ear 46 so that it does not engage the pin 47. At the same time the cam surfaces 45, in turning counter-clockwise (Fig. 4), depress and hold the corresponding pair of kicker-bars 14 and the pawl 21 therefor out of engagement with the kicker-cams 20 and the timing-cams 19. Under these circumstances each of the valve stems 57 may be operated by hand. For this purpose a separate hand lever 48 is provided for each individual valve stem 57.

The levers 48 are fulcrumed at 49 on a bracket 58 fixed to the casing 16, and are pivotally connected at their lower ends to a clevis 59 keyed on the valve stem 57 by a link 60 pivotally connected with the clevis 59. When each hand lever 48 is pulled forward the valve stem 57 is rotated in the opposite direction, and whenever the stem 57 is automatically rotated the levers 48 move back and forth.

In instances where it is desired to have provision for cutting individual kicker-bars into or out of service, a structure as shown in Figs. 3 and 5 is provided. A separate knob 61, on a shaft 62, is provided, through the casing 16, for each individual set of kicker-bars 14. Each shaft 62 is provided with a stop 63 and a rack 64. In this instance the shut-down cams 44 freely encircle the shut-down shaft 43 and are united by screws 66 to a gear 67 which is in mesh with the rack 64. When it is desired to cut out any individual set of kicker-bars the individual knob 61 therefor is pulled forwardly drawing the rack 64 with it, thus turning the gear 67 and cam 44 clockwise (Fig. 5), depressing the set of kicker-bars 14, and simultaneously the shut-down ear 46 draws the pin 47 to position the valve stem to correct position for shut down (shown in dotted lines in Fig. 5) of the valve stem 57, should it be in any other position. To restore or cut in the valve stem 57, the knob is merely pushed into the position shown in full lines in Fig. 5. To maintain the rack 64 in its desired position the bottom thereof is notched as shown at 68 to receive a ball bearing 69 under pressure of a spring 70. In this arrangement, as the cams 44 freely encircle the shut-down shaft 43 for free rotation, the shaft 43 is provided with cam-stops 71 for cooperation with a portion 72 of each of the shut-down cams 44, to limit the counterclockwise movement of the cams 44. Upon rotation of the shut-down shaft 43 to automatic shut-down position, stops 71 rotate the cams 44 clockwise to the position indicated in dotted lines in Fig. 5. In the normal running position the kicker-bars 14 slide back and forth over the flattened portion 73 of the shut-down cam surfaces 45.

In event it is necessary or desirable to operate the timing-cam shaft manually a hand crank is provided connected to the main driving gear on the timing-shaft to time the manual operation of the various hand levers 48, the time for operating the respective levers 48 being determined by appropriate markings on the timing cams by visual inspection through the glass or other transparent cover 39.

In lieu of the shut-down lever for operating the shut-down shaft, the shut-down may be made automatic by applying a hydraulic cylinder with a rack and pinion connection to the shut-down shaft, to control the rotation of the shaft, all as more fully described in said Stone Patent 1,955,033.

This invention as hereinabove set forth is embodied in particular forms of construction but may be variously embodied within the scope of the claims hereinafter made.

I claim:

1. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating-mechanisms of the set thereof; the respective actuating-mechanisms of the set being mounted for separate movement into and out of direct driving engagement with the driving-mechanism therefor; means normally urging the respective actuating-mechanisms into position for driving engagement with the driving mechanism therefor; and separate time-controlled means for the respective actuating-mechanisms adapted for cooperating with connecting-means therefor on the respective actuating-mechanisms to hold the actuating mechanisms out of driving engagement against the action of the urging means, and periodically release its hold on the connecting means so that the actuating mechanism may move into driving engagement under the action of the means for urging, to effect the positioning of the respective actuating-mechanisms into and out of driving engagement with the driving-mechanism therefor.

2. Apparatus as claimed in claim 1, and in which the respective actuating-mechanisms are provided with shifting-means cooperating with the connecting-means and operable by the driven movement of the actuating mechanisms to be shifted away from the time-controlled means and thereby shift and disconnect the connecting means from the time-controlled means during driving of the respective actuating-mechanisms by the driving-mechanism therefor.

3. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating mechanisms of the set thereof; the respective actuating-mechanisms of the set being mounted for separate movement into and out of direct driving engagement with the driving mechanism therefor; means normally urging the respective actuating-mechanisms into position for driving engagement with the driving-mechanism therefor; and separate time-controlled means for the respective actuating mechanisms cooperating with connecting-means therefor on the respective actuating mechanisms to control periodically the positioning of their respective actuating-mechanisms into and out of driving engagement with the driving-mechanism therefor, and in which universal shut-down means is provided for holding the respective actuating-mechanisms out of driving engagement with the driving mechanism therefor concurrently with the holding out of other similar elements by the universal shut-down means while leaving the time-controlled means in operative relationship with the aforesaid connecting means therefor.

4. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating mechanisms of the set thereof; the respective actuating-mechanisms of the set being mounted for separate movement into and out of direct driving engagement with the driving mechanism therefor; means normally urging the respective actuating-mechanisms into position for driving engagement with the driving-mechanism therefor; and separate time-controlled means for the respective actuating mechanisms cooperating with connecting-means therefor on the respective actuating mechanisms to control periodically the positioning of their respective actuating-mechanisms into and out of driving engagement with the driving-mechanism therefor and in which universal shut-down means is provided for holding the respective actuating-mechanisms out of driving engagement with the driving-mechanism therefor concurrently with the holding out of other similar elements by the universal shut-down means while leaving the time-controlled means in operative relationship with the aforesaid connecting means therefor; and in which one of the actuating-mechanisms of the set is provided with retracting means for retraction by the shut-down means and adapted when retracted thereby to retract the actuating-mechanism and its aforesaid device to a predetermined position for shut-down.

5. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating mechanisms of the set thereof; the respective actuating-mechanisms of the set being mounted for separate movement into and out of direct driving engagement with the driving mechanism therefor; means normally urging the respective actuating-mechanisms into position for driving engagement with the driving-mechanism therefor; and separate time-controlled means for the respective actuating mechanisms cooperating with connecting-means therefor on the respective actuating mechanisms to control periodically the positioning of their respective actuating-mechanisms into and out of driving engagement with the driving-mechanism therefor, and which includes universal shut-down means comprising a rotatable shaft, a shut-down element freely rotatable on the shaft for the set of actuating-mechanisms and adapted when rotated to hold the set of actuating-mechanisms out of driving engagement with the driving-mechanism therefor, connecting means fixed to the shaft for rotation therewith and adapted to engage and rotate the shut-down element upon rotation of the shaft; and an individual manually operable cut out means for the shut-down element for individually rotating the shut-down element freely of the shaft.

6. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating mechanisms of the set thereof; the respective actuating-mechanisms of the set being mounted for separate movement into and out of direct driving engagement with the driving mechanism therefor; means normally urging the respective actuating-mechanisms into position for driving engagement with the driving-mechanism therefor; and separate time-controlled means for the respective actuating mechanisms cooperating with connecting-means therefor on the respective actuating mechanisms to control periodically the positioning of their respective actuating-mechanisms into and out of driving engagement with the driving-mechanism therefor, and which includes universal shut-down means comprising a rotatable shaft, a shut-down element freely rotatable on the shaft for the set of actuating-mechanisms and adapted when rotated to hold the set of actuating-mechanisms out of driving engagement with the driving-mechanism therefor, connecting means fixed to the shaft for rotation therewith and adapted to engage and rotate the shut-down element upon rotation of the shaft; an individual manually operable cut out means for the shut-down element for individually rotating the shut-down element freely of the shaft; and retracting means on one of the actuating-mechanisms of the set for retraction by the shut-down element for the set when the latter is rotated, the retracting means being adapted when retracted by the its shut-down element to retract the actuating mechanism and its aforesaid device to a predetermined position for shut-down.

7. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating mechanisms of the set thereof; the respective actuating-mechanisms of the set being mounted for separate movement into and out of direct driving engagement with the driving mechanism therefor; means normally urging the respective actuating-mechanisms into position for driving engagement with the driving-mechanism therefor; and separate time-controlled means for the respective actuating mechanisms cooperating with connecting-means therefor on the respective actuating mechanisms to control periodically the positioning of their respective actuating-mechanisms into and out of driving engagement with the driving-mechanism therefor, and which includes shut-down element individual to the set of actuating-mechanisms and adapted when actuated to hold the set of actuating-mechanisms out of driving engagement with the driving-mechanism therefor, and individual manually operable cut out means for individually operating the shut-down element.

8. In apparatus for automatic sequential control, in combination: a set of oppositely acting actuating-mechanisms connectable to a device to oppositely actuate the same for controlling the direction of movement of an operating mechanism; continuously operable driving-power means having driving-mechanism for driving the respective actuating mechanisms of the set thereof; the respective actuating-mechanisms of the set being mounted for separate movement into and out of direct driving engagement with the driving mechanism therefor; means normally urging the respective actuating-mechanisms into position for driving engagement with the driving-mechanism therefor; and separate time-controlled means for the respective actuating mechanisms cooperating with connecting-means therefor on the respective actuating mechanisms to control periodically the positioning of their respective actuating-mechanisms into and out of driving engagement with the driving-mechanism therefor, and which includes a shut-down element individual to the set of actuating-mechanisms and adapted when actuated to hold the set of actuating-mechanisms out of driving engagement with the driving-mechanism therefor, an individual manually operable cut out means for individually operating the shut-down element; and retracting means on one of the actuating-mechanisms of the set for retraction by the shut-down element for the set when the latter is actuated, the retracting means being adapted when retracted to retract the actuating-mechanism and the aforesaid device to a predetermined position for shut-down.

9. In apparatus for automatic sequential control, in combination: a device adapted to be oppositely actuated for controlling the direction of movement of an operating mechanism; a set of oppositely acting actuating-mechanisms for the device for actuating the same; continuously operable driving-power means having driving-mechanism for driving the respective actuating-mechanisms; the respective actuating-mechanisms of the set being mounted for separate movement into and out of direct driving engagement with the driving-mechanism therefor; means normally urging the respective actuating-mechanisms into position for driving engagement with the driving mechanism therefor; separate time-controlled means for the respective actuating-mechanisms cooperating with connecting means therefor on the respective actuating-mechanisms to control periodically the positioning of their respective actuating-mechanisms into and out of driving engagement with the driving mechanism therefor; universal shut-down means operable in one direction for hand operation and operable in another direction for complete shut-down of the control and the aforesaid devices, said shut-down means being adapted to hold the respective actuating-mechanisms out of driving engagement with the driving-mechanism therefor concurrently with the holding out of other similar elements by the universal shut-down means; and an individual manual operating lever connected to said device for operation thereof when the shut-down means is at hand control position; and retracting means on one actuating-mechanism of the set for retraction by the shut-down means at complete shut-down position for retracting the device to a predetermined position for complete shut-down.

10. In apparatus for automatic sequential control, in combination: a device adapted to be oppositely actuated for controlling the direction of movement of an operating mechanism; a set of oppositely acting actuating-mechanisms for the device for actuating the same; continuously operable driving-power means having driving-mechanism for driving the respective actuating-mechanisms; the respective actuating-mechanisms of the set being mounted for separate movement into and out of direct driving engagement with the driving-mechanism therefor; means normally urging the respective actuating-mechanisms into position for driving engagement with the driving mechanism therefor; separate time-controlled means for the respective actuating-mechanisms cooperating with connecting means therefor on the respective actuating-mechanisms to control periodically the positioning of their respective actuating-mechanisms into and out of driving engagement with the driving mechanism therefor; universal shut-down means operable for hand operation, said shut-down means being adapted to hold the respective actuating-mechanisms out of driving engagement with the driving-mechanism therefor concurrently with the holding out of other similar elements by the universal shut-down means; and an individual manual operating lever connected to said device for operation thereof when the shut-down means is at hand control position.

11. In apparatus for automatic sequential control, in combination: a set of oppositely acting kicker-bars, the kicker-bars of the set being connectable at one end thereof to a device to oppositely actuate the same; a continuously rotatable kicker-cam shaft; kicker-cams on the shaft for the set of kicker-bars; means normally urging the respective kicker-bars into position for direct driving engagement of their opposite driven ends by the kicker-cams; a separate timing-cam for each kicker-bar, each timing-cam having a cam portion cooperating with a timing-cam engager portion on its respective kicker-bar to maintain the driven end of the latter out of driving engagement by the kicker-cam, and each timing-cam having a cam portion cooperating with timing-cam engager portion to periodically bring the driven end of the kicker-bar into driving engagement with the kicker-cam.

12. Apparatus as claimed in claim 11, and in which each of the kicker-bars are mounted for relative sliding movement within a kicker-bar slide carrying a pawl at its upper part extending across the kicker-bar freely thereof as the timing-cam engager portion, and in which the second mentioned timing-cam portion of each timing-cam comprises an offset portion for receiving the pawl; and in which a spring pressed plunger engages in a slot in the bottom of the slide in a plane to one side of the plane of the pawl to urge the slide and kicker-bar toward the kicker-cam and timing-cam; and in which the slide carries a plurality of spaced cams connectable to the kicker-bar by extending through correspondingly spaced inclined slots in the kicker-bar.

13. Apparatus as claimed in claim 11, and in which a universal shut-down shaft is provided, shut-down cams having cam surfaces thereon for engaging the respective kicker-bars upon actuation of the shut-down shaft to concurrently hold the driven ends of the respective kicker-bars out of driving engagement by their kicker-cams.

14. Apparatus as claimed in claim 11, and in which a universal shut-down shaft is provided, shut-down cams having cam surfaces thereon for engaging the respective kicker-bars upon actuation of the shut-down shaft to hold the driven ends of the respective kicker-bars out of driving engagement by their kicker-cams concurrently with the holding out of other similar elements by the universal shut-down means; and in which the shut-down cams are provided with a cam-ear; and in which one of the kicker-bars of the set is provided with a retracting-pin for retraction by the cam-ear for retraction of the kicker-bar and its aforesaid device to a predetermined position for shut-down.

15. Apparatus as claimed in claim 11, and which includes a universal shut-down rotatable shaft having shut-down cams freely rotatable on the shaft for the set of kicker-bars and provided with a gear and also with cam-surfaces for holding the driven ends of the kicker-bars out of driving engagement with the kicker-cams, means on the rotatable shaft for engaging and rotating the shut-down cams on rotation of the shaft; and an individual cut out lever having a rack for actuating the gear of the shut-down cams individually freely of the rotatable shaft.

16. Apparatus as claimed in claim 11, and which includes a universal shut-down rotatable shaft having shut-down cam-means freely rotatable on the shaft for the set of kicker-bars and provided with a gear and also with a cam-surface-means for holding the driven ends of the kicker-bars out of driving engagement with the kicker-cams, means on the rotatable shaft for engaging and rotating the shut-down cam-means on rotation of the shaft; and individual cut out lever having a rack for actuating the gears of the shut-down cam-means individually freely of the rotatable shaft; a retracting pin on one of the kicker-bars of the set; and a cam-ear on the shut-down cam-means for retraction of the retracting-pin and the kicker-bars and their aforesaid device to a predetermined position for shut-down.

17. Apparatus as claimed in claim 11, and which includes rotatable shut-down cam-means individual to the set of kicker-bars, said shut-down cam-means having a gear and also cam-surface-means thereon for holding the driven end of the kicker-bars out of driving engagement with the kicker-cams; and an individual manually operable rack for individually rotating the gear of the shut-down cam-means.

18. Apparatus as claimed in claim 11, and which includes rotatable shut-down cam-means individual to the set of kicker-bars, said shut-down cam-means having a gear and also cam-surface-means thereon for holding the driven end of the kicker-bars out of driving engagement with the kicker-cams; an individual manually operable rack for individually rotating the gear of the shut-down cam-means; a retracting pin on one of the kicker-bars of the set; and a cam-ear on the shut-down cam-means for retraction of the retracting-pin and its kicker-bars and their aforesaid device to a predetermined position for shut-down.

WALTER A. BARR.